(12) United States Patent
Guyan et al.

(10) Patent No.: US 7,376,647 B1
(45) Date of Patent: May 20, 2008

(54) METHOD FOR EVALUATING ACTIVITY-BASED COSTS OF A COMPANY

(75) Inventors: G. Victor Guyan, Bethlehem, PA (US); Michael A. Costonis, Glenside, PA (US); Vanessa Gabriela Gallo, Wallingford, PA (US); Michael A. Lucarini, Marlton, NJ (US)

(73) Assignee: Accenture LLP, Chicago, IL (US)

( * ) Notice: Subject to any disclaimer, the term of this patent is extended or adjusted under 35 U.S.C. 154(b) by 425 days.

(21) Appl. No.: 09/618,286

(22) Filed: Jul. 18, 2000

(51) Int. Cl.
*G06F 7/00* (2006.01)

(52) U.S. Cl. .............. 707/4; 707/10; 705/10

(58) Field of Classification Search ............. 705/11, 705/8, 9, 7, 10, 30, 32; 707/4; 715/503–510
See application file for complete search history.

(56) References Cited

U.S. PATENT DOCUMENTS

| | | | | |
|---|---|---|---|---|
| 4,847,791 A * | 7/1989 | Martin et al. | ............... | 702/178 |
| 5,249,120 A * | 9/1993 | Foley | ............... | 705/1 |
| 5,429,506 A * | 7/1995 | Brophy et al. | ............... | 434/107 |
| 5,600,554 A * | 2/1997 | Williams | ............... | 705/1 |
| 5,634,055 A * | 5/1997 | Barnewall et al. | ............... | 707/103 R |
| 5,684,964 A * | 11/1997 | Powers et al. | ............... | 705/11 |
| 5,732,401 A * | 3/1998 | Conway | ............... | 705/29 |
| 5,734,592 A | 3/1998 | Cox et al. | | |
| 5,799,286 A * | 8/1998 | Morgan et al. | ............... | 705/30 |
| 5,819,231 A * | 10/1998 | Tremaine | ............... | 705/7 |
| 5,842,182 A * | 11/1998 | Bonner et al. | ............... | 705/32 |
| 5,884,275 A | 3/1999 | Peterson et al. | | |
| 5,893,074 A * | 4/1999 | Hughes et al. | ............... | 705/8 |
| 5,909,672 A * | 6/1999 | Madore et al. | ............... | 705/32 |
| 5,966,693 A * | 10/1999 | Burgess | ............... | 705/4 |
| 6,032,123 A * | 2/2000 | Jameson | ............... | 705/8 |
| 6,038,554 A * | 3/2000 | Vig | ............... | 705/400 |
| 6,067,525 A * | 5/2000 | Johnson et al. | ............... | 705/10 |
| 6,081,900 A * | 6/2000 | Subramaniam et al. | ............... | 726/19 |
| 6,092,047 A * | 7/2000 | Hyman et al. | ............... | 705/4 |
| 6,119,097 A * | 9/2000 | Ibarra | ............... | 705/11 |
| 6,189,029 B1 * | 2/2001 | Fuerst | ............... | 709/217 |

(Continued)

FOREIGN PATENT DOCUMENTS

CA 2 332 938 A1 12/1999

(Continued)

OTHER PUBLICATIONS

Derfler, Frank J. et. al. How Networks Work, Millennium Ed., Que Corporation, Jan. 2000.*

(Continued)

*Primary Examiner*—Andrew Joseph Rudy
(74) *Attorney, Agent, or Firm*—Brinks Hofer Gilson & Lione

(57) ABSTRACT

Methods and systems consistent with the present invention provide a survey tool for allocating costs of a company. A survey is presented to an employee of the company via a network, for example, the Internet. The survey includes a list of activities and asks the employee to rank the activities based on the amount of time spent working on the activities. The survey also prompts the employee to provide information including average hours worked per week, job position, etc. A server receives the employee's responses and, using company information stored by the server, allocates costs of the company.

23 Claims, 5 Drawing Sheets

U.S. PATENT DOCUMENTS

| | | | |
|---|---|---|---|
| 6,267,671 | B1 | 7/2001 | Hogan |
| 6,269,355 | B1* | 7/2001 | Grimse et al. ................ 706/46 |
| 6,282,514 | B1* | 8/2001 | Kumashiro .................... 705/7 |
| 6,338,042 | B1* | 1/2002 | Paizis ........................... 705/11 |
| 6,356,875 | B1* | 3/2002 | Green et al. ................... 705/9 |
| 6,519,763 | B1* | 2/2003 | Kaufer et al. ................ 717/101 |
| 6,556,974 | B1* | 4/2003 | D'Alessandro ............. 705/10 |
| 6,578,013 | B1 | 6/2003 | Davis et al. |
| 6,604,080 | B1* | 8/2003 | Kern ............................ 705/4 |
| 6,625,647 | B1* | 9/2003 | Barrick, Jr. et al. ........ 709/224 |
| 6,640,302 | B1* | 10/2003 | Subramaniam et al. ..... 713/169 |
| 6,714,914 | B1* | 3/2004 | Peters et al. ................... 705/4 |
| 6,732,079 | B1* | 5/2004 | Kintner et al. ................. 705/8 |
| 6,735,569 | B1* | 5/2004 | Wizig ........................... 705/4 |
| 6,735,585 | B1* | 5/2004 | Black et al. ................... 707/3 |
| 6,766,319 | B1* | 7/2004 | Might ........................... 707/4 |
| 6,766,322 | B1* | 7/2004 | Bell ............................. 707/10 |
| 6,823,315 | B1* | 11/2004 | Bucci et al. ................... 705/9 |
| 6,850,895 | B2* | 2/2005 | Brodersen et al. ............. 705/9 |
| 6,862,596 | B2* | 3/2005 | Thomsen ...................... 707/10 |
| 6,970,831 | B1* | 11/2005 | Anderson et al. ............. 705/11 |
| 6,976,002 | B1* | 12/2005 | Ferguson et al. ............. 705/11 |
| 7,013,284 | B2* | 3/2006 | Guyan et al. ................... 705/9 |
| 2001/0034630 | A1* | 10/2001 | Mayer et al. .................. 705/7 |
| 2002/0035506 | A1* | 3/2002 | Loya ........................... 705/14 |
| 2002/0046073 | A1* | 4/2002 | Indseth et al. ................. 705/8 |
| 2002/0046210 | A1* | 4/2002 | Thomsen ................... 707/100 |
| 2003/0088452 | A1* | 5/2003 | Kelly .......................... 705/10 |
| 2004/0024620 | A1* | 2/2004 | Robertson et al. ............. 705/4 |
| 2004/0093257 | A1* | 5/2004 | Rogers et al. ................ 705/10 |
| 2004/0138950 | A1* | 7/2004 | Hyman et al. ................ 705/14 |

FOREIGN PATENT DOCUMENTS

| | | |
|---|---|---|
| WO | WO 99/41707 | 8/1999 |

OTHER PUBLICATIONS

White, Ron, How Computers Work Millennium Ed. Que Corporation, Sep. 1999.*

Gralla, Preston, How the Internet Works, Millennium Ed., Que Corporation, Aug. 1999.*

UpShot Online Admin Guide, from UpShot.com 1999.*

Timeslips Deluxe, Getting the Most from Timeslips, Timeslips Corporation, 1995.*

Muller, Nathan J., Desktop Encyclopedia of the Internet, Artech House, Inc., 1998.*

Borland's Paradox for Windows User's Guide, Borland International, Inc, 1994.*

Greene, James H, Editor-in-Chief, Production and Inventory Control Handbook, 3rd Ed., McGraw-Hill Companies, Inc., 1997.*

Riley, David D., Data Abstraction and Stucture, An Introduction to Computer Science II, Boyd and Fraser Publishing Company, 1987.*

Borland's ReportSmith for Windows User's Guide, Borland International, Inc, 1994.*

Bragg, Steven M., Accounting Best Practices, John Wiley and Sons, Inc., 1999.*

Andy Feibus, "Automated Time-Trackers Tenrox's Office Timesheet 2000 and Sage U.S.'s Timesheet Professional help employees keep track of their projects and help companies better manage workers and their expense reports," (Jul. 5, 1999) online as of May 26, 2006; informationweek.com <http://www.informationweek.com/742/42oltrk.htm>.

* cited by examiner

Org Entity:

Average Hours Worked Per Week:

Number of Years of Industry Experience:

Number of Years with the Company:

Job / Position Title:

Employment status: ○ Full Time

○ Part Time [____] % of the time

Handle Claims: [100] % of the time

| Percent | Line of Business | Claim Type |
|---------|------------------|------------|
| | Line of Business | Claim Type |
| | Line of Business | Claim Type |
| | Line of Business | Claim Type |

| Task # | Rank | Description | Hours | % Time |
|--------|------|-------------|-------|--------|
| 1 | | Description | ## | ##% |
| 2 | | Description | ## | ##% |
| 3 | | Description | ## | ##% |
| 4 | | Description | ## | ##% |
| 5 | | Description | ## | ##% |

Analyze for: ○ Hours/Week  ○ Hours/Month  ○ Minutes/Day

FIG. 4

METHOD FOR EVALUATING ACTIVITY-BASED COSTS OF A COMPANY

I. BACKGROUND OF THE INVENTION

A. Field of the Invention

The present invention relates to methods for allocating costs of a company. More particularly, the present invention relates to methods for allocating activity-based costs of a company using information provided by employees of the company.

B. Description of the Related Art

In today's marketplace, companies of all types strive to reduce costs while improving customer service. For example, insurance companies work to improve service to policyholders while reducing the costs associated with processing insurance claims. Insurance companies may also wish to reduce the time required to process claims or improve overall operating efficiency. To achieve its goals, a company can employ many business tools.

One such tool is an employee survey. A company can survey its employees to evaluate the company's performance. By understanding how employees spend their time, the company can determine the costs associated with specific tasks or activities performed by the employees. The company can use these cost determinations to develop and evaluate future plans for the company. For example, an insurance company could survey its claims handlers to determine the cost of processing a certain claim type.

To conduct an employee survey, a company can administer the survey itself or hire an outside firm to develop and administer the survey. Either way, a survey must be created and presented to the employees, and the employees' responses must be recorded and tallied. This can be done by distributing a paper survey to some or all of the employees, who complete and return the survey. Alternatively, designated survey-takers could sit down with each employee, read the questions to the employee, and record the employee's answers on the survey.

The utility of the survey results depends on the survey questions and the accuracy of employee responses. If the survey is too brief or worded poorly, the results may not be detailed enough to provide meaningful feedback to the company. Similarly, if taking the survey is difficult or time-consuming, it is likely that employees will give rushed or incomplete responses. It is therefore desirable to develop a method that provides flexibility in creating a survey and a user-friendly mechanism for administering the survey.

II. SUMMARY OF THE INVENTION

Methods consistent with the present invention provide a survey tool for allocating costs of a company. A survey is presented to an employee of the company via a network, for example, the Internet. The survey includes a list of activities and asks the employee to rank the activities based on the amount of time spent working on the activities. The survey also prompts the employee to provide information including average hours worked per week, job position, etc. A server receives the employee's responses and uses company information stored by the server to allocate costs of the company.

One method consistent with the present invention allocates costs of a company by storing, on a server, a company profile, including information on activities of the company and information about employees of the company. The server receives input from an employee of the company via a browser running on a client computer, the input including a rank corresponding to an activity performed by the employee. The server calculates an employee cost of the activity based on the rank.

Another method consistent with the present invention allocates a cost of an activity performed by an employee of a company by sending a survey request for an HTML document containing a survey about the activity from a browser running on a client computer to a server. The HTML document containing the survey is displayed on the client computer. The survey includes a set of questions and a set of input components corresponding to the set of questions. Input is received from the employee in response to the set of questions using the input components, and the input is sent from the browser to the server. An employee cost of the activity is calculated based on the input.

Consistent with the present invention, a user interface is provided for collecting information from an employee of a company. The user interface is presented to an employee using a client computer running a browser, and includes four components and a button enabling the employee to request an analysis of the information provided in the four components. The first component includes a first set of fields for providing information about the employee's employment with the company. The second component includes a second set of fields for providing information about a position held by the employee within the company. The third component includes a third set of fields for providing information about the employee's work on one or more types of business of the company. The fourth component includes a fourth set of fields for providing a rank corresponding to each of one or more tasks performed by the employee.

Another method consistent with the present invention allocates costs of processing insurance claims by storing at a server a company profile, including information on insurance claims processed by a company and information about employees of the company. Input is received from an employee of the company via a client computer, the input including a rank corresponding to an activity performed by the employee in the processing of insurance claims. The server calculates an employee cost of the activity based on the rank.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate one embodiment of the invention and together with the description, serve to explain the principles of the invention. In the drawings:

FIG. 4 depicts a user interface for presenting a survey to an employee consistent with the present invention.

IV. DETAILED DESCRIPTION

To provide an accurate allocation of a company's costs, a survey tool consistent with the present invention enables a user to categorize activities, or tasks, of a company and to receive input from the company's employees about the tasks. The tasks performed by employees of the company to be surveyed can be described in a task list. The more detailed the task list, the more specific the survey results and cost allocation can be. A survey interface can be used to present the task list and other survey questions to an employee, and to receive the employee's responses. By providing great flexibility in categorizing the tasks and by making the survey interface user-friendly, methods consistent with the present invention provide a dynamic survey tool for accurately and efficiently allocating costs of a company.

Consistent with the present invention, the survey can be sent to employees, and responses can be received, via the Internet. This eliminates the need for survey-takers to travel to meet with employees of a company and increases the likelihood of getting a high rate of survey completion. For example, automatic e-mail reminders could be sent via the Internet to employees and their supervisors reminding them about unfinished or incomplete surveys. Presenting the survey on a single screen on the employee's computer display will save the employee time and make it more likely that the employee will complete the survey.

Survey data collected via the Internet can be received and automatically tallied in a matter of minutes or hours, providing constant feedback to the company and its employees. Survey results could be provided via the Internet on a periodic basis such as monthly or quarterly, as company needs evolve. When the company implements changes like increased employee training or task automation, periodic surveys can enable the company to measure results more quickly.

Figure 1:
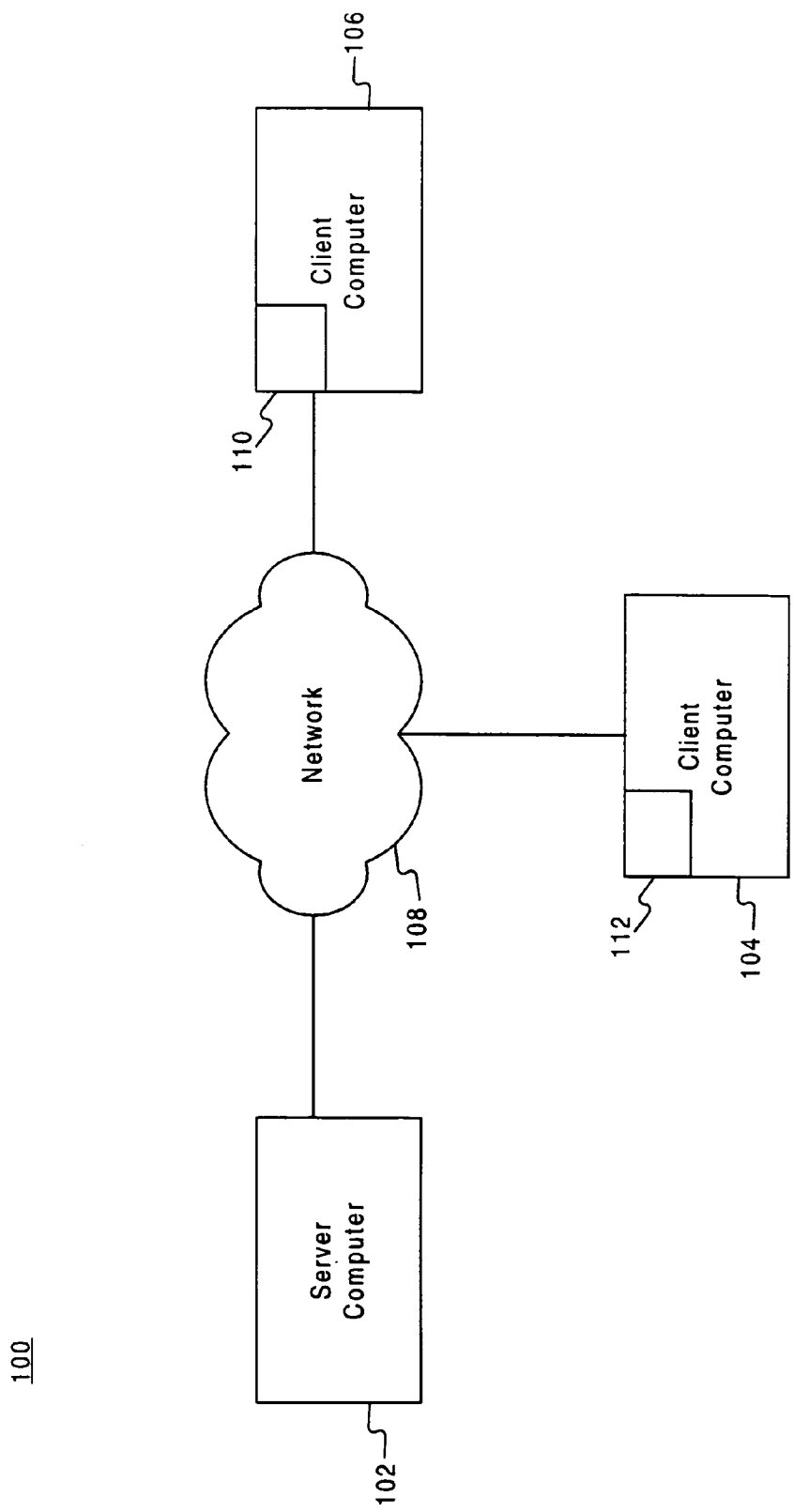
FIG. 1 depicts a distributed system suitable for practicing methods and systems consistent with the present invention.

FIG. 1 depicts a distributed system 100 suitable for practicing methods and systems consistent with the present invention. Distributed system 100 includes a plurality of computers 102, 104, and 106, communicating via a network 108. Network 108 may be a local area network, wide area network, or the Internet. Client computers 104 and 106 run browser software 112 and 110 respectively for accessing remote server 102 via network 108. Browser software 110 and 112 may be Microsoft Internet Explorer from Microsoft Corporation of Redmond, Wash.

Figure 2:
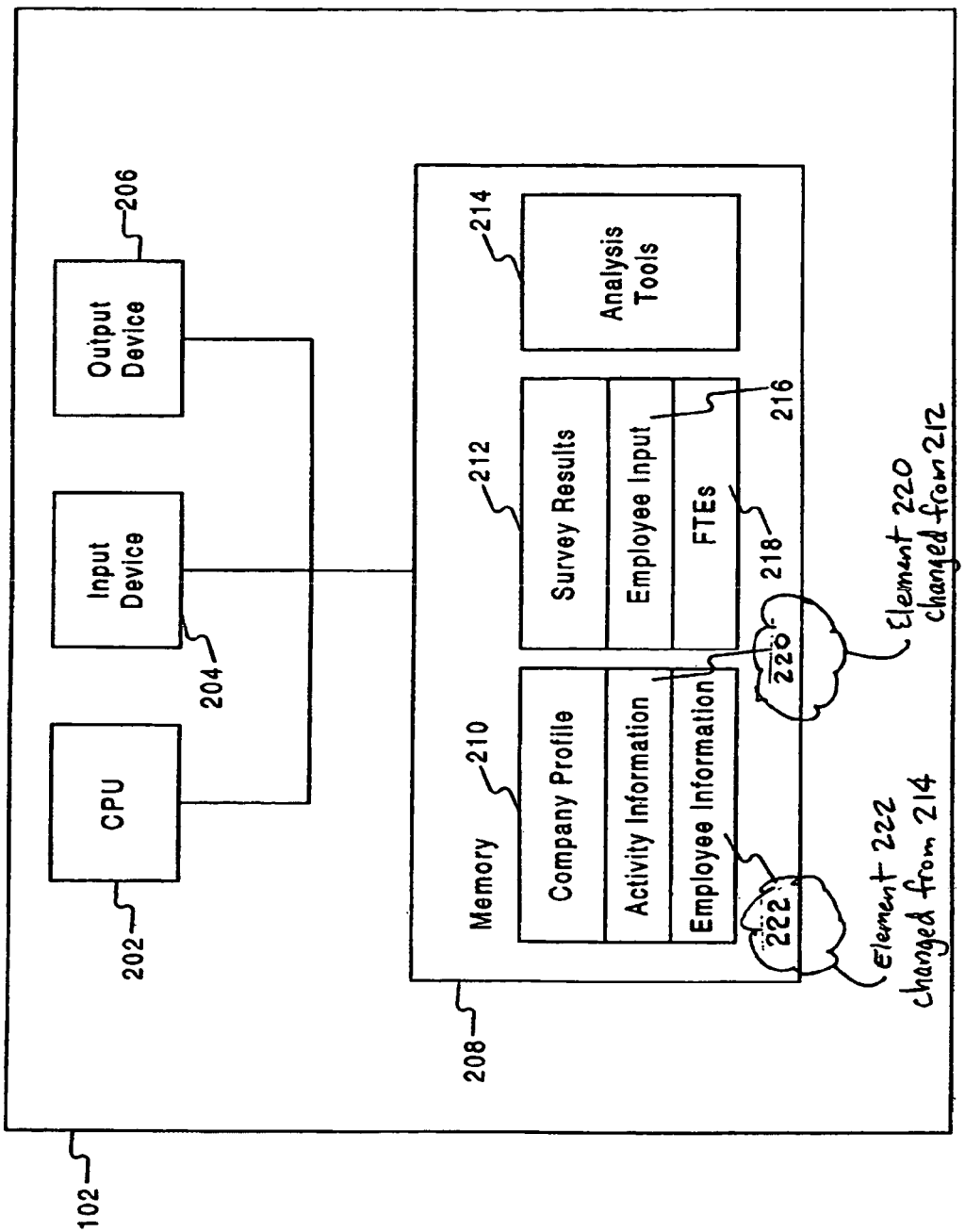
FIG. 2 is a block diagram showing a server computer in more detail.

FIG. 2 is a block diagram showing server computer 102 in more detail. Server computer 102 includes a central processing unit (CPU) 202, an input device 204, an output device 206, and a memory 208. Input device 204 can be, for example, a keyboard or a mouse. Output device 206 can be, for example, a video display or a printer. Memory 208 can be, for example, random access memory or an external storage medium such as a magnetic or optical disk or CD-ROM. Memory 208 contains company profile information 210, survey results 212, and analysis tools 214.

Company profile information 210 includes activity information 220 and employee information 222. Activity information 220 includes a task list of all tasks, or activities, performed by employees of the company. For an insurance company, a task might be "complete first report of injury form" or "confirm policy coverage." In the task list, the company's tasks can be assigned to a line of business and/or claim type. For example, the "automobile" line of business would include claim types such as "personal injury" or "property damage." Tasks can also be assigned to a claim phase, for example, "initial contact" or "coverage verification," or to a process category. Process categories are defined by the company, allowing for dynamic, flexible categorization of activities.

In addition to the task list, activity information 220 can include the company name, total number of employees, claim volume, claim types, organizational entities, etc. Organizational entities, e.g., "Chicago North Clark Office, Unit A," describe the structural units of a company with great flexibility. The company is not limited to traditional, rigid descriptions, e.g., headquarters or branch office, but can group its activities and employees into any organizational scheme for purposes of the survey. The survey can then be administered to employees in select organizational entities, or the survey results can be reported at the organizational entity level.

Company profile information 210 also includes employee information 222, which can include a total number of employees, a list of job positions in the company, the median salary for each job position, benefits costs for each job position, and the number of employees in each job position. To provide added flexibility in the survey analysis, the job positions can be assigned to a job category such as "administration" or "claims adjusting."

As described above, company profile information 210 is collected and stored in memory 208 of server computer 102. Company profile information 210 is used to create the survey that is presented to the employee. In general, the survey presents a list of the tasks performed by an employee and requests the employee to assign a rank to each of the tasks based on the amount of time the employee spends on the activity. The survey creation and contents are explained in greater detail below with reference to FIGS. 4 and 5.

In addition to company profile information 210, memory 208 contains survey results 212. Survey results 212 can include employee input 216 entered in response to the survey. For example, the employee input can include: the employee's job position, the organizational entity in which the employee works, and the rank assigned by the employee to an activity. Survey results 212 can also include full time equivalents (FTEs) 218. FTEs measure costs in terms of full time employees based on salary midpoints and benefits compensation data. Server computer 102 calculates FTEs based on employee input 216 and company profile information 210 using analysis tools 214. For example, the rank assigned to an activity by an employee can be converted to an FTE through a squared weighted average calculation. This FTE can then be multiplied by the median salary plus benefits of the employees job position to derive an employee cost.

Alternatively, analysis tools 214 could direct server computer 102 to calculate costs based on job category, claim type, claim phase, or line of business process categories. These different outputs can help the company identify opportunities such as automating an activity or reallocating time to more value added activities. FTEs 218 are used by the server to create reports to the company showing the results of the survey.

Reports can be produced automatically by server computer 102 via output device 206. These reports capitalize on the breadth of data captured by the survey tool, e.g., salary midpoints and benefits compensation. FTEs 218 can be reported, for example, by lines of business, claim type, or job position.

In an alternative configuration, server computer 102 may consist of multiple computers, including a computer that handles communicating with client computers and another computer that maintains a database with company profile 210 and survey results 212. The analysis tools may be located on yet another computer in this configuration.

Figure 3:
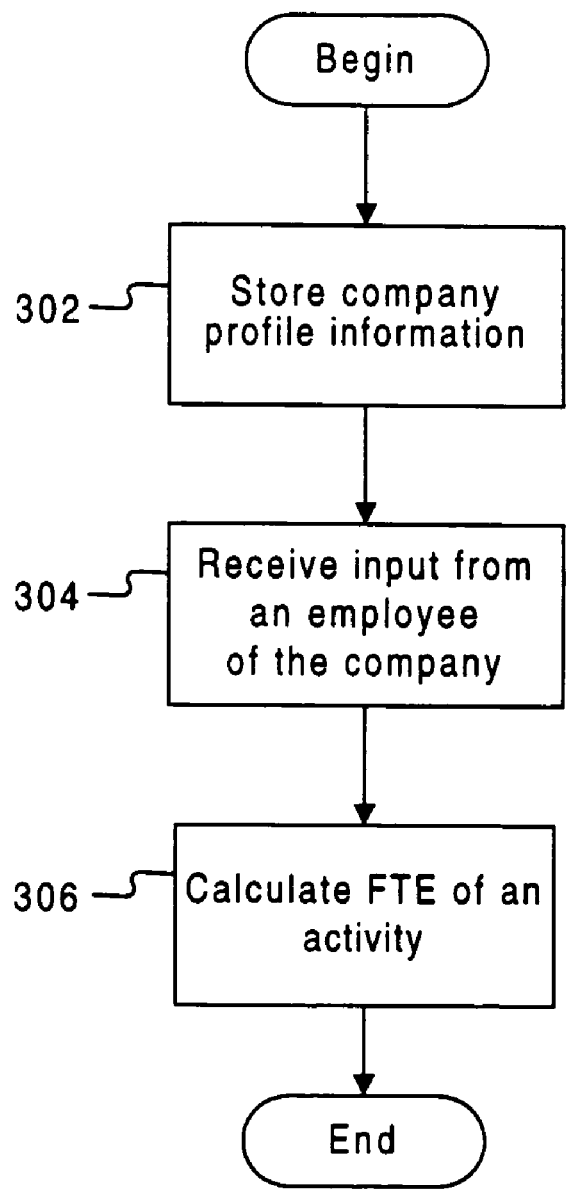
FIG. 3 is a flow chart of a method for allocating costs of a company consistent with the present invention.

FIG. 3 is a flow chart of a method for allocating costs of a company consistent with the present invention. First, company profile information 210 is stored by server computer 102 (step 302). As described above, company profile information 210 contains company activity information 220 as well as employee information 222. When input is received from an employee at a client computer such as client computer 106 (step 304), server computer 102 calculates an FTE of an activity for the employee (step 306). Using the FTE of the activity for the employee and company profile information, server computer 102 can then calculate an overall cost of the activity to the company.

FIG. 4 depicts a user interface for presenting a survey to an employee consistent with the present invention. If the employee is using browser 110 on client computer 106, the survey can be an HTML document with text and fields for the employee to complete. As shown in FIG. 4, the survey requests the employee to type in general information including organizational entity, average hours worked per week, number of years of industry experience, and number of years with the company. The survey document also requests position information including job/position title and employment status. The survey also presents a list of tasks and requests the employee to assign a rank to each task the employee performs. Preferably, the rank can be a relative ranking where the employee assesses the amount of time spent on one task relative to the time spent on other tasks.

The user interface can also provide an "Analyze" button that the employee can select to submit the input to server computer 102 for analysis by hours/week, hours/month, or minutes/day. These numbers can be calculated automatically by server computer 102 based on the average hours worked per week and employment status entered by the employee. The user interface can provide "Save" and "Done" buttons to enable the employee to save the input at client computer 106 or to exit.

Figure 5:
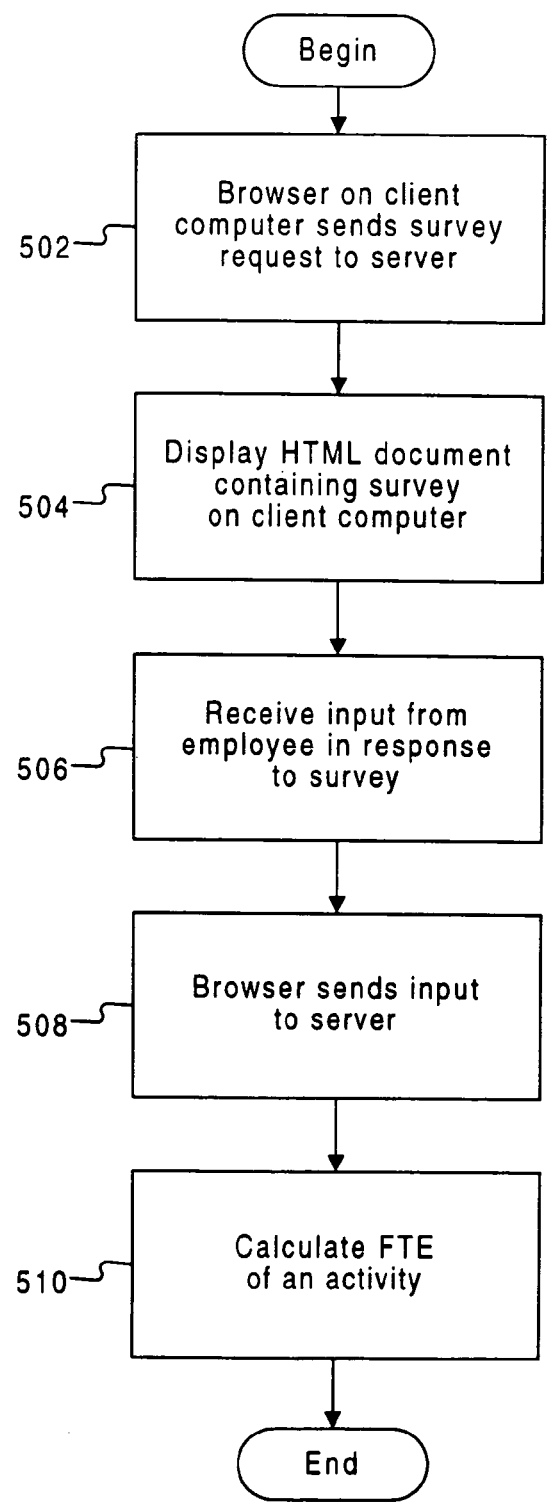
FIG. 5 is a flow chart showing a method for collecting information from the employee via the user interface.

FIG. 5 is a flow chart showing a method for collecting information from the employee via the user interface. When the employee is ready to take the survey, browser 110 of client computer 106 sends a survey request to server computer 102 via network 108 (step 502). Server computer 102 sends the HTML document containing the survey to client computer 106 where it is displayed (step 504). When the employee completes the survey, browser 110 receives the input (step 506), and sends the input to server computer 102 (step 508). Server computer 102 then calculates an FTE per employee (step 510).

In an alternative embodiment of the present invention, server computer 102 could send a second HTML document containing the employee cost or other calculated costs to browser 110. The second HTML document would be displayed to the employee at client computer 106, who would have the option of modifying the input entered into the user interface. Also, other types of formatted documents may be used, for example, XML and ASP formats.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for allocating costs of a company, the method comprising:
providing a computer-readable medium containing instructions for controlling a server, the server communicating via a network with a plurality of client computers, each client computer running a browser;
storing a company profile, including information on a plurality of activities performed by employees of the company and information about employees of the company;
displaying a survey including a list of the plurality of activities performed by employees of the company on the browser of at least one of the plurality of client computers, the survey further including input fields for receiving data entered by a user of the at least one of the plurality of client computers;
receiving inputs entered into said input fields from the at least one of the plurality of client computers, the inputs comprising a plurality of relative rankings of the plurality of activities performed by an employee;
displaying the plurality of relative rankings on a computer monitor;
calculating an employee cost of each activity of the plurality of activities based on the received plurality of relative rankings, wherein the plurality of relative rankings are based on the plurality of activities being ranked according to a first amount of time an employee spends to perform a corresponding first activity of the plurality of activities relative to other amounts of time the employee spends to perform the other activities of the plurality of activities, and the calculating includes converting each relative ranking of the received plurality of relative rankings into a time the employee spends performing each corresponding activity; and
displaying on the computer monitor the calculated employee cost of each activity of the plurality of activities.

2. The method of claim 1, further including:
determining an overall cost of the activity using the employee cost and the company profile.

3. The method of claim 2, further including:
creating a costing model based on the overall cost of the activity; and
identifying opportunities to reduce costs of the company using the costing model.

4. The method of claim 1, wherein the storing step further includes:
assigning one or more lines of business to the activities of the company.

5. The method of claim 4, further including:
assigning one or more insurance claim categories to each line of business.

6. The method of claim 1, wherein the storing step further includes:
assigning one or more insurance claim categories to an activity of the company.

7. The method of claim 1, wherein the storing step further includes:
assigning an insurance claim phase category to an activity of the company.

8. The method of claim 1, wherein the storing step further includes:
assigning one or more job categories to the employees of the company.

9. The method of claim 1, wherein the storing step further includes:

assigning a process category to an activity of the company.

10. The method of claim 8, further including:
storing job information corresponding to each job position in each job category, the job information including a midpoint salary and the number of employees of the company assigned to the job category.

11. The method of claim 1, wherein the storing step further includes:
designating one or more organizational entities to describe a structure of the company; and
wherein the receiving step further includes: receiving an identifier of one of the organizational entities to in which the employee works.

12. The method of claim 11, further including:
calculating an organizational entity cost for the activity using the employee cost of each employee working in the organizational entity.

13. The method of claim 1 further comprising receiving further inputs comprising modified relative rankings, and re-calculating the employee cost based on the modified relative rankings.

14. A method for allocating costs of a company, the method comprising:
storing on a computer memory a company profile, including activity information on a plurality of activities performed by employees of the company and job information corresponding to a job position in a job category, the job information including a midpoint salary and the number of employees of the company assigned to the job position;
presenting a survey to a user interface on a computer display, the survey having a plurality of input fields for receiving data input by a user
receiving from the user interface an identification of the job position of an employee;
presenting on the survey a list of activities performed by the employee;
receiving an input including a rank assigned to an activity on the presented list of activities performed by the employee, the rank being a relative ranking based on the amount of time the employee spends on said activity relative to the amount of time spent on other activities on the presented list of activities performed by the employee;
calculating by a computer an employee cost of each activity based on the received rank and the stored job information; and
displaying on the computer display the received rank and calculated employee cost.

15. The method of claim 14, wherein the storing step further includes:
assigning one or more job categories to the employees of the company, and aggregating the employee costs across the job categories.

16. The method of claim 14, wherein the storing step further includes:
assigning to at least some of the activities of the plurality of activities at least one of an insurance claim category, an insurance claim phase category, an insurance claim process category, or combinations thereof; and
determining the employee costs of the activities assigned to at least one insurance claim category, insurance claim phase category or insurance claim process category.

17. The method of claim 14, wherein the storing step further includes:
assigning an activity to a line of business of the company;
assigning one or more insurance claim type categories to each line of business; and
determining the employee costs of the activities assigned to at least one line of business or insurance claim type category.

18. The method of claim 14, further comprising receiving from the user interface the number of hours an employee works per week, and the calculating further includes retrieving the received number of hours and determining the costs based on the received number of hours and the midpoint salary.

19. The method of claim 14, further comprising designating one or more organizational entities to describe a structure of the company;
receiving from the user interface an identification of one of the organizational entities in which the employee works; and
determining the employee costs of each activity for at least one organizational entity of the company.

20. The method of claim 14, further comprising providing a computer-readable medium containing instructions for controlling a server, the server communicating via a network with a plurality of client computers, each client computer running a browser for providing the user interface.

21. The method of claim 14, further comprising calculating by the computer the hours and percent time corresponding to an activity based on the received rank, and displaying on the computer display the calculated hours and percent time.

22. The method of claim 14 further comprising receiving a modified rank and re-calculating the employee cost based on the modified rank.

23. The method of claim 14 further comprising calculating an amount of time an employee spends on the activity based on the received rank, and calculating the employee cost based on the calculated amount of time.

* * * * *